Patented Aug. 2, 1949

2,477,872

UNITED STATES PATENT OFFICE 2,477,872

PRODUCTION OF UREAS

Vernon E. Haury, El Cerrito, Calif., assignor to Shell Development Company, San Francisco, Calif., a corporation of Delaware No Drawing. Application February 8, 1943,
Serial No. 475,214

5 Claims. (Cl. 260—553)

This invention relates to a process for the production of useful nitrogen-containing organic compounds which comprises reacting an organic compound containing two nitrogen atoms, each of which is directly linked by a single bond to the same carbon atom which in turn is directly linked by its two remaining bonds to a divalent substituent, such as oxygen, sulfur or the imino group, and wherein at least one replaceable hydrogen atom is attached to at least one of the amino nitrogen atoms, with a ketone or an aldehyde and with hydrogen in the presence of a hydrogenation catalyst.

The products prepared according to the process of the invention may be represented by the general formula:

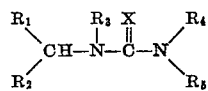

wherein $R_3$, $R_4$ and $R_5$ represent the same or different substituents of the group consisting of the hydrogen atom and hydrocarbon radicals or substituted hydrocarbon radicals, $R_1$ and $R_2$ may be the same or different substituents of the group consisting of the hydrogen atom and hydrocarbon or substituted hydrocarbon radicals, or $R_1$ and $R_2$ together may represent a single divalent hydrocarbon or substituted hydrocarbon radical which may jointly with the carbinyl carbon atom form a ring, and X is a substituent of the group consisting of oxygen, sulfur, and the imino group.

Urea, thiourea, guanidine and the corresponding nitrogen-hydrocarbon substituted derivatives containing at least one replaceable hydrogen atom directly linked to a nitrogen atom form a class of chemically related compounds which behave in a like manner as regards their reaction with ketones or aldehydes in accordance with the process of the invention. The execution of the process of the invention comprises reaction of the urea, thiourea or guanidine with hydrogen and an aldehyde or ketone in the presence of a hydrogenation catalyst at an elevated temperature. The reaction results in the replacement of one or more of the hydrogen atoms joined to one or more of the nitrogen atoms of the urea, thiourea or guanidine compound by the hydrocarbon or substituted hydrocarbon radical formed from the ketone or aldehyde by substitution of a hydrogen atom for the oxygen atom of the carbonyl group thereof.

The general reactions involved may be illustrated by references to the following equations representing the reaction of acetone with hydrogen and a urea, a thiourea, and a guanidine, respectively.

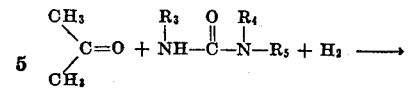

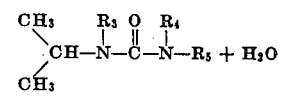

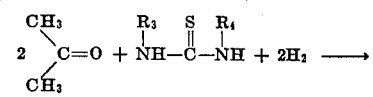

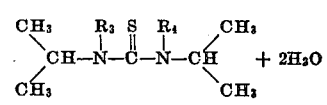

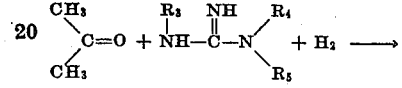

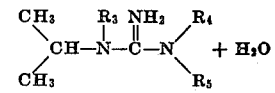

The term "ketaldone" is used herein and in the appended claims to designate the aldehydes and ketones which may be represented by the general formula

wherein $R_1$ and $R_2$ may be the same or different hydrocarbon radicals or substituted hydrocarbon radicals, which may be cyclic, acyclic, saturated or unsaturated, or $R_1$ and $R_2$ together may represent a single divalent hydrocarbon or substituted hydrocarbon radical, which may jointly with the carbonyl carbon atom form a ring; or $R_1$ may be hydrogen and $R_2$, a hydrocarbon or substituted hydrocarbon radical which may be cyclic, acyclic, saturated or unsaturated. When $R_1$ and $R_2$ are both hydrocarbon radicals or together represent a single divalent hydrocarbon radical, the compound is a ketone; whereas, if $R_1$ is hydrogen and $R_2$ a hydrocarbon radical, the compound is an aldehyde. The following are representative ketaldones: acetone, methyl ethyl ketone, mesityl oxide, methyl isobutyl ketone, formaldehyde, acetaldehyde, isobutyraldehyde, benzaldehyde, methyl vinyl ketone, methyl isopropenyl ketone, ethyl benzyl ketone, cyclopentanone, cyclohexanone, isophorone, diacetone alcohol, aldol, chloral, dimethyl ketol, diacetone amine, triacetone amine, methyl cyclohexanone, trimethyl cyclohexanone, and the like and their homologues and suitable substitution products.

The ureas, thioureas and guanidines employed in the execution of the process of the invention may be represented by the general formula:

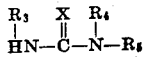

wherein $R_3$, $R_4$ and $R_5$ may be the same or different and represent hydrogen atoms or hydrocarbon radicals or substituted hydrocarbon radicals, and X may be a divalent substituent such as oxygen, sulfur and the imino group. When $R_3$, $R_4$ and $R_5$ represent hydrogen atoms, the reactant is urea, thiourea or guanidine. When one or more of the radicals represented by $R_3$, $R_4$ or $R_5$ is a hydrocarbon radical, the reactant is a substituted urea, thiourea or guanidine. Suitable hydrocarbon radicals which $R_3$, $R_4$ and $R_5$ may represent are alkyl, aryl, alkaryl, aralkyl, alkenyl, aralkenyl, alicyclic, and the like.

A suitable urea may possess one, two, or three such hydrocarbon radicals substituted in place of hydrogens of the amino groups, and be of simple or mixed character. The following are representative ureas: methyl urea, ethyl urea, the propyl ureas, the butyl ureas, the amyl ureas, the hexyl ureas, N-dimethyl urea, N-diethyl urea, the N-dipropyl ureas, the N-dibutyl ureas, N,N'-dimethyl urea, N,N'-diethyl urea, the N,N'-dipropyl ureas, the N,N'-dibutyl ureas, N-methyl,N'-ethyl urea, the N-ethyl,N'-propyl ureas, the N-propyl,N'-butyl ureas, benzyl urea, phenyl urea, xylyl urea, N-dibenzyl urea, N-diphenyl urea, N,N'-dibenzyl urea, N,N'-diphenyl urea, N-methyl,N'-benzyl urea, the N-propyl,N'-phenyl ureas vinyl urea, allyl urea, butenyl urea, N-divinyl urea, N-diallyl urea, N,N'-divinyl urea, N,N'-diallyl urea, N-vinyl,N'-benzyl urea, N-allyl,N'-phenyl urea, N-dimethyl,N'-benzyl urea, N-divinyl,N'-phenyl urea, and the like and their homologues.

The thioureas and guanidines suitable for use in the execution of the invention may also possess one, two or three hydrocarbon radicals substituted in place of hydrogens of the amino groups, and be of simple or mixed character. Representative thioureas and guanidines are methylthiourea, ethyl guanidine, the hexyl guanidines, N-dimethyl thiourea, benzyl thiourea, phenyl guanidine, symmetrical dioctyl guanidine, N-methyl,N'-benzyl thiourea, vinyl thiourea, allyl guanidine, N-diallyl thiourea, symmetrical divinyl guanidine, N-allyl,N'-phenyl thiourea, N-dimethyl,N'-phenyl thiourea and the like and their homologues.

The invention may be executed in any suitable type of apparatus. For example, the urea or related compound, the ketone or aldehyde, and, if desired, a suitable solvent for both of the organic reactants may be charged along with a hydrogenation catalyst in any suitable manner, severally or in admixture, to a reaction vessel of appropriate size, such as an autoclave, which is preferably equipped with suitable heating means and/or means for agitating the contents as by mechanical stirring. The selected mutual solvent should be a relatively good solvent for the organic reactants and it should be substantially inert under the reaction conditions. In some cases, the mutual solvent for the organic reactants may also be a solvent for the organic reaction product or products. Suitable mutual solvents for this purpose are water and the alcohols, particularly the aliphatic monohydric alcohols such as methanol, ethanol, propanol, isopropanol, butanol, secondary butanol, tertiary butanol, and the like. Hydrocarbons or hydrocarbon mixtures may also be conveniently applied. The mutual solvent is necessarily dependent upon the nature of the reactants employed and should be present in effective amounts, e. g. at least enough to bring about solution of portions of both organic reactants, but not enough to materially decrease the concentration of the reactants or in any other way to decrease the efficiency of the reaction. After each run the mutual solvent employed may, if desired, be recovered by distillation or other appropriate means.

The invention is preferably executed at a temperature of from about 80° C. to about 250° C., although higher or lower temperatures may be employed when necessary or desirable. Temperatures below 80° C. are in some cases undesirable due to the low rate of reaction and the small yield. Temperatures greater than about 250° C. are in some cases undesirable in that losses due to destruction of the carbonyl compounds and the urea, thiourea or guanidine compounds may be prohibitive to the economical execution of the process. The optimum temperature is dependent upon the nature of the reactants employed, their concentration in the reaction mixture, the activity of the particular hydrogenation catalyst employed, the time of reaction, the pressure employed, etc.

The invention may be executed at any convenient pressure. I prefer to execute the reaction under a superatmospheric pressure to increase materially the velocity of the reaction and to obtain higher yields. In most cases, pressures of from about 1 atmosphere to about 100 atmospheres are suitable, although higher or lower pressures may be used when necessary or desirable. Generally, pressures of from about 50 to about 75 atmospheres are preferred.

The urea, thiourea or guanidine may be reacted with an equivalent molecular quantity of ketone or aldehyde and of hydrogen, or, the ketone or aldehyde and/or hydrogen may be in substantial molar excess. The relative proportions of the reactants in the reaction mixture will, in general, determine the nature of the predominant organic reaction product. For example, if one mole of urea is reacted with substantially one mole of acetone and one mole of hydrogen, mono-isopropyl urea is formed; if one mole of urea is reacted with substantially two moles of acetone and two moles of hydrogen, N,N'-diisopropyl urea is formed.

The process is executed in the presence of a hydrogenation catalyst. Any member of the group of materials known as "hydrogenation catalysts" which has the requisite activity under the conditions of execution of the process may be advantageously employed. For example, the oxides or sulfides of the metals, particularly the oxides or sulfides of nickel, tungsten, molybdenum, cerium, thorium, chromium and zirconium or mixtures comprising two or more metal oxides and/or sulfides or one or more metal oxides or sulfides with one or more metals, have been found useful as catalysts and components of catalyst mixtures. Compound catalysts comprising two or more metals in admixture or alloyed as, for example, silver-copper, copper-chromium, copper-zinc, nickel-cobalt, nickel-zinc, etc., are valuable catalysts. Catalysts selected from the group consisting of the noble metals as silver, gold, platinum, palladium, etc., may be employed, although I prefer a metal catalyst such as nickel, iron, cobalt, copper, chromium or thallium, in a finely divided state or deposited on a suitable carrier. Excellent results may be obtained by employing a pyrophoric metal catalyst such as Raney nickel catalyst. The amount of the catalyst to be used will be dependent upon the material to be hydrogenated and upon the activity and nature of the catalyst. When Raney nickel is used, the catalyst is generally applied in an amount equal to about 1% to about 20% by weight of the organic reactants in the reaction mixture. However, considerable variation in this proportion may be made.

The following specific examples illustrate suitable modes of executing the invention. It is to be understood that the examples are for illustrative purposes only and should not be regarded as limiting the specific reactants, conditions, or modes of operation of this invention.

Example I

A mixture of about 10 moles of acetone and about 1 mole of urea with enough water added to give a homogeneous solution was placed in a two-liter hydrogenation autoclave with about 50 g. of Raney nickel catalyst. Hydrogen was added and the mixture was heated to about 150° C. to 160° C. at a total pressure of about 68 atmospheres for about two hours. Isopropyl alcohol and some unreacted acetone were removed by distillation from the crude reaction product. On cooling, a crystalline product separated from the aqueous residue. This crystalline product was recovered, purified and analyzed. It was found to be symmetrical diisopropyl urea having a melting point of about 192° C.

Example II

N-methylisobutylcarbinyl urea was prepared by treating a solution of about 2 moles of urea and about 2 moles of methyl isobutyl ketone in about 600 ml. of methanol with hydrogen for one hour at about 120° C. and a total pressure of about 68 atmospheres and in the presence of about 50 g. of Raney nickel catalyst. Methyl alcohol and methyl isobutyl carbinol were removed from the crude product by steam distillation. On cooling, a crystalline product separated from the aqueous residue and was recovered by filtering. This product was found to be N-methylisobutylcarbinyl urea having a melting point of from about 144° C. to 145° C.

The organic reaction products prepared in accordance with the process of the invention are adapted to a wide variety of uses. For example, many of the compounds may be used as dye intermediates, as materials for the manufacture of synthetic resins, as accelerators for the vulcanization of rubber compounds and as inhibitors of corrosion. Some are also used in the pickling of metals, as modifiers of lubricants, as antioxidants in various organic materials, as textile assistants or as colloidal surface active or capillary active materials. Many of the substituted compounds are useful as parasiticides, foam stabilizing agents, froth flotation agents, as agents having medicinal or bactericidal properties, as surface coatings for colloidal smokeless powders, etc. The uses mentioned will suggest many similar ones.

I claim as my invention:

1. A process for the production of N-methylisobutylcarbinyl urea which comprises reacting urea with methyl isobutyl ketone and hydrogen in the presence of a Raney nickel catalyst at a temperature in the range of from about 90° C. to about 180° C.

2. A process for the production of symmetrical diisopropyl urea which comprises reacting urea with a molar amount of acetone and of hydrogen substantially in excess of the number of moles of urea, in the presence of water and a Raney nickel catalyst at a temperature of from about 90° C. to about 180° C.

3. A process for the production of an isopropyl urea which comprises reacting urea with acetone and hydrogen in the presence of a hydrogenation catalyst.

4. A process for the production of an N-alkyl substituted urea which comprises reacting urea with an aliphatic ketone and hydrogen in the presence of a hydrogenation catalyst.

5. A process for the production of an N-hydrocarbon substituted urea which comprises reacting urea with a ketone and hydrogen in the presence of a hydrogenation catalyst.

VERNON E. HAURY.

REFERENCES CITED

The following references are of record in the file of this patent:

UNITED STATES PATENTS

| Number | Name | Date |
| --- | --- | --- |
| 2,045,574 | Adkins | June 30, 1936 |
| 2,257,239 | Krzikalla et al. | Sept. 30, 1941 |
| 2,305,620 | Kremers | Dec. 22, 1942 |

FOREIGN PATENTS

| Number | Country | Date |
| --- | --- | --- |
| 560,353 | Germany | Oct. 8, 1932 |

OTHER REFERENCES

Karrer, "Organic Chemistry" (1938), page 115.